Feb. 20, 1951 R. NAGY 2,542,091
ZINC SILICATE PHOSPHORS AND METHOD OF MAKING SAME
Filed Aug. 21, 1946

INVENTOR
R. NAGY.
BY
ATTORNEY

Patented Feb. 20, 1951

2,542,091

UNITED STATES PATENT OFFICE 2,542,091

ZINC SILICATE PHOSPHORS AND METHOD OF MAKING SAME

Rudolph Nagy, Bloomfield, N. J., assignor to Westinghouse Electric Corporation, East Pittsburgh, Pa., a corporation of Pennsylvania Application August 21, 1946, Serial No. 692,121

17 Claims. (Cl. 252—301.6)

This invention relates to the preparation of phosphors and, more particularly, to the employment of an improved heating schedule to increase the output and stability.

The principal object of my invention, generally considered, is to produce improved manganese-activated zinc-containing silicate phosphors, by giving the raw materials a preheating treatment prior to heating at the normal firing temperature.

Another object of my invention is to use a heretofore-unsuspected reaction to produce a phosphor having a better output, taking less time and power to manufacture, and which is more stable against photodecomposition.

A further object of my invention is to use an improved method in preparing certain phosphors, involving holding the raw materials at a relatively low combining temperature, such as about 800° C., for a moderate length of time, such as about one hour, causing all the ingredients to combine to form the manganese-activated silicate, and then heating for a moderate length of time, such as for about one to two hours longer at a normal firing temperature, such as about 1200° C., to effect the desired crystallization.

A still further object of my invention is to produce a manganese-activated zinc-containing silicate phosphor which is unusually white, as indicating that all the manganese has entered the silicate lattice, rather than pinkish which characterizes a normally prepared silicate phosphor, has greater density, and an output increased by about 5%.

Other objects and advantages of the invention will become apparent as the description proceeds.

Referring to the drawing.

In my study of thermal changes in phosphors during heating, I have discovered a heretofore unsuspected reaction, which I propose to use to produce a phosphor having improved qualities. By thermal analysis of phosphors, the various exothermic and endothermic reactions during heat treatment can be studied, and the corresponding crystal configuration determined by means of X-ray diffraction. Thermal analysis study of fluorescent compounds, in conjunction with X-ray diffraction analysis, are shown to provide a means of determining the proper formation temperature of phosphors.

The apparatus which I employed for my thermal analysis was similar to that used by Norton, in accordance with his article which appeared in the Journal of the American Ceramic Society, pages 54 to 64, vol. 22, 1939. In brief, I used a program controller to increase the temperature of the furnace at a constant rate. The actual temperature of the furnace was determined by placing a sample of alumina therein and imbedding a platinum-10% rhodium thermocouple therein. A portable potentiometer was used to record the temperature. A differential thermocouple was imbedded in the alumina and the raw materials used for making the phosphor being tested, so that only the difference in temperature of the two samples would be measured. A sensitive potentiometer, capable of reading to a hundredth of a millivolt, was used for these measurements. A Picker X-ray diffraction unit with an iron tube operated at 30 kv. and 10 ma. was used for the X-ray analyses. A small Debye-Sherrer powder camera having a radius of 3.59 centimeters was employed for identification purposes. A back reflection camera was used to study the shift in lattice spacings of the substances tested.

Figure 1:
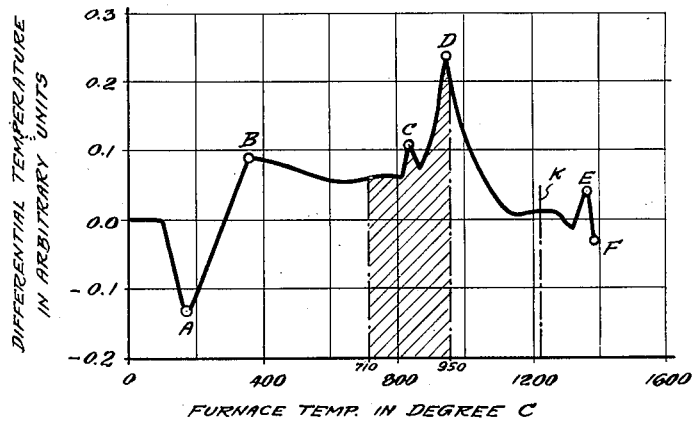
Figure 1 is a thermal diagram illustrating the basis for my improved process, particularly for the manufacture of manganese-activated zinc beryllium silicate phosphor.

The exothermic and endothermic reactions occurring in the formation of the phosphors being produced were studied by slowly heating the unfired materials in a thimble-size platinum crucible. These were placed in an electric furnace and the temperature changes in the samples observed. The rate of increase in temperature of the furnace was 13° per minute. Lower and higher rates of heating were also tried but not found as satisfacory. The temperature of the furnace was taken every 5 minutes and the differential temperature every minute. A thermal analysis curve showing such exothermic and endothermic reactions for manganese-activated zinc beryllium silicate is illustrated in Figure 1, and was obtained by plotting the differential temperatures expressed in millivolts against the furnace temperatures.

Samples for X-ray diffraction study were taken out of the furnace just before and after any significant exothermic or endothermic change occured in the sample, and the crystal structure of the substance determined. When the shift in lattice spacing was to be measured by means of a back reflection camera, the sample to film distance was set at 5.1 centimeters.

Manganese-activated zinc beryllium silicate is generally prepared by ball-milling zinc oxide, beryllium oxide, silicic acid and manganous carbonate, mixed in the proper proportions, for about two hours, and then firing for from three to four hours is an electrically-heated furnace at from 1200° to 1250° C. Too high a temperature, or too long a heating period, will result in a discolored product having a poor output. However, when insufficient heating is employed, the product will neither be completely combined nor stable in a fluorescent lamp. The method which I propose will insure a complete reaction, without any discoloration and loss of output.

The raw materials for manganese-activated zinc beryllium silicate may be prepared by ball-milling together, or otherwise intimately mixing, 7.4 moles of zinc oxide, 1 mole of beryllia, 5 moles of silicic acid, and .5 mole of manganous carbonate. The thermal analysis curve for treating such a mixture is as shown in Figure 1. The X-ray diffraction patterns of the samples taken between points E and F on the curve have a zinc silicate structure. However, the back reflection X-ray diffraction lines show a contraction of lattice spacing at high temperatures as shown in curve G of Figure 2. This contraction of lattice spacing can be explained by the fact that the smaller beryllium ions replace larger zinc ions. The sample fired at 1050° C. fluoresced green and the color gradually changed to yellow, orange and pink as the firing temperature increased.

Figure 2:
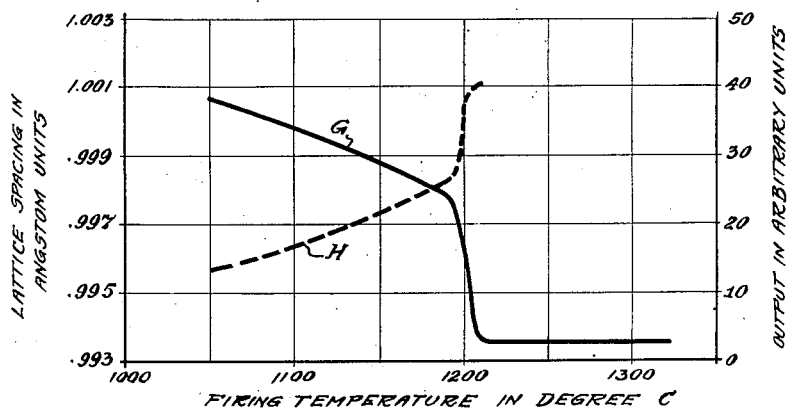
Figure 2 is a diagram illustrating the effect of the firing temperature of manganese-activated zinc beryllium silicate phosphor on the lattice spacing and output.

It would appear, therefore, that in the heating of the raw materials, zinc silicate is first formed and that, at the higher firing temperatures, the beryllium slowly enters into solid solution with the zinc silicate, forming zinc beryllium silicate. The output of the product, as shown by curve H of Figure 2, is closely related to the contraction of the lattice spacing. Both the output and lattice spacing change very rapidly in the short temperature range between 1190° and 1210° C. and, therefore, the optimum firing temperature is very critical and confined to that region.

Reverting to Figure 1, we find that the first reaction or deviation from the zero point of the differential temperature scale, is endothermic at point A, indicating a loss of water from silicic acid. Heat would be required to remove both absorbed and chemically bound water. Exothermic point B has not been satisfactorily explained, but may be due to a more rapid diffusion of heat into zinc oxide and silica than into the alumina of the sample by which the furnace temperature was determined. The preliminary heating has a tendency to make the mass very porous.

X-ray diffraction pictures taken before and after point C show no change in crystal structure, the X-ray patterns being mainly those of zinc oxide. The silica evidently was in an amorphous state and gave no contribution to the X-ray pattern. The exothermic point C may represent a change in silica from one form to another, while point D corresponds to a formation of zinc silicate. X-ray diffraction patterns for samples taken between points D and E correspond to ortho silicate structure, while point F is the melting temperature of the silicate. The usual firing temperature is about 1200° C. or slightly higher, as represented by the line K.

Figure 3:
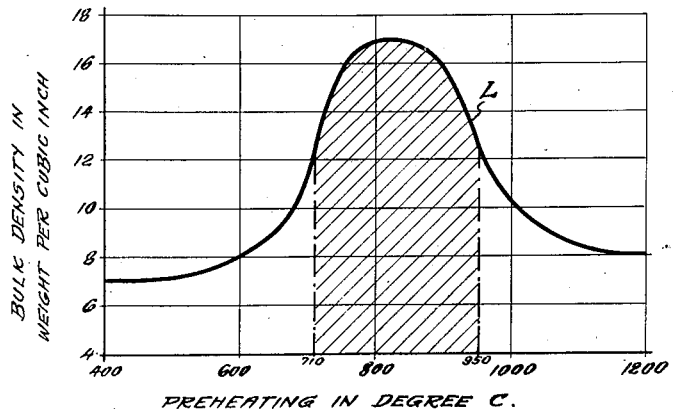
Figure 3 is a diagram showing the effect of preheating manganese-activated zinc-containing silicate phosphor on its density.

It will thus be seen that while no important reaction appeared to occur until point D, where we have the formation of the compound zinc beryllium silicate, yet as shown by the rising tendency of the curve beginning at about 800° C., the reaction appears to start at about this point. This was proved by preheating the ingredients for manganese-activated zinc beryllium silicate phosphors at various temperatures, ranging from 400° to 1200° C., and subsequently firing them at 1220° C. for one hour, the curve L of Figure 3 being plotted from the results. It can be seen from this curve L, that by preheating at about 800° C. as the optimum temperature, or between about 710° and 950° C., a very large increase in density or weight per unit volume is obtained. Similar results were obtained with zinc silicate.

I have, therefore, found that by holding the raw materials for either of the silicates mentioned for one hour at about 800° C., all the ingredients combined as desired and this fact was corroborated by the X-ray diffraction study. The preheated phosphor is then raised to the normal firing temperature, or placed in a high temperature furnace and heated for an hour or two longer. Phosphors so produced are very white, indicating that all the manganese has entered the lattice of the silicate, and especially the zinc beryllium silicate. A normally-prepared zinc beryllium silicate phosphor, however, has a pinkish color indicative of uncombined manganese. The density of the phosphor prepared by preheating at about 800° C. is always greater than that of a similar normal phosphor, signifying a more complete reaction. The fluorescent output of the preheated phosphor is about 5% higher than that of a similar normally-produced phosphor. Less time and electrical energy are needed to make phosphors by my proposed preheating technique. As an example, heating for one hour at 800° C. and then for one hour at 1200° C. gives a more completely combined phosphor than heating the ingredients for two hours at 1220° C. If a lower treating temperature is used, a longer treatment is preferred.

The increased extent of combination was at first thought to be due to the presence of water in the silicic acid. However, even after the water was completely removed by first dehydrating such acid at 1200° C., the resulting phosphor made from the resulting silica, by my proposed method of heating, was more satisfactory than that made by the previous normal method. It is my theory that the preheating to about 800° C. produces the silicate compound in a generally amorphous condition, and the subsequent treatment at the higher temperature of about 1200° C., changes the compound to the desired crystalline condition for use as a phosphor.

Although only two phosphors have been mentioned, it is pointed out that my process is suitable generally for the preparation of manganese-activated silicate phosphors, other examples of such being the manganese-activated phosphors of zinc beryllium magnesium silicate, zinc beryllium cadmium silicate, zinc beryllium calcium silicate, zinc beryllium strontium silicate, zinc beryllium barium silicate, zinc beryllium zirconium silicate, zinc beryllium aluminum silicate, and combinations thereof. However, my treatment is not useful for non-silicate phosphors such as magnesium tungstate and cadmium borate.

Although preferred embodiments of my invention have been disclosed, it will be understood that modifications may be made within the spirit and scope of the appended claims.

I claim:
1. The method of manufacturing manganese-activated zinc-containing silicate phosphors, comprising thoroughly mixing the activator-included raw materials required to produce a silicate phosphor, preheating said materials at a temperature between about 710° and 950° C. for about one hour to cause the formation of the desired silicate in a generally amorphous condition, the lower the temperature the longer the required time, and finally heating said silicate at a temperature between 1190° and 1210° C., for a length of time sufficient to cause desired crystallization for improvement in output.

2. The method of manufacturing manganese-activated zinc-containing silicate phosphors, comprising thoroughly mixing the activator-included raw materials required to produce a silicate phosphor, preheating said materials at a temperature of between about 710° and 950° C. for about one hour to cause the formation of the desired silicate in a generally amorphous condition, and finally heating said silicate at a temperature of about 1200° C. for about one to two hours to cause desired crystallization for improvement in output.

3. The method of manufacturing a manganese-activated zinc-containing silicate phosphor, comprising thoroughly mixing the activator-included raw materials required to produce said silicate phosphor, preheating said materials at a temperature between about 710° and 950° C. for about one hour, to cause the formation of the desired silicate, and finally heating said silicate at a temperature between 1190° and 1210° C. for about one hour.

4. The method of manufacturing a manganese-activated zinc-containing silicate phosphor, comprising thoroughly mixing the activator-included raw materials required to produce said silicate phosphor, preheating said materials at a temperature between about 710° and 950° C. for about one hour, to cause the formation of the desired silicate, and finally heating said silicate at a temperature of about 1200° C. for about one hour.

5. The method of manufacturing manganese-activated zinc silicate phosphor, comprising preheating the thoroughly-mixed activator-included raw materials required to produce said silicate phosphor at a temperature of about 800° C. for about one hour, to cause the formation of manganese-activated zinc silicate, and finally heating said silicate at a temperature of about 1200° C. for about one hour.

6. The method of manufacturing manganese-activated zinc beryllium silicate phosphor comprising thoroughly mixing zinc oxide, beryllium oxide, silicic acid, and manganous carbonate in the proportions required to produce said silicate phosphor, preheating said mixture at a temperature of about 800° C. for about one hour, to cause said materials to combine, and finally heating said combined mixture at a temperature of about 1200 C. for about one hour.

7. The method of manufacturing manganese-activated zinc beryllium silicate comprising intimately mixing about 7.4 moles of zinc oxide, about one mole of beryllia, about 5 moles of silicic acid, and about ½ mole of manganous carbonate, preheating said mixture at a temperature of about 800° C. for about one hour, to cause said materials to combine, and finally heating said combined mixture at a temperature of about 1200° C. for about one hour.

8. The method of manufacturing manganese-activated zinc beryllium silicate phosphor comprising intimately mixing about 7.4 moles of zinc oxide, about one mole of beryllia, about 5 moles of silicic acid, and about ½ mole of manganous carbonate, preheating said mixture at a temperature of about 800° C. for about one hour, to cause said materials to combine, and finally heating said combined mixture at a temperature between about 1190° C. and 1210° C. for about one to two hours.

9. The method of manufacturing manganese-activated zinc-containing silicate phosphors comprising intimately mixing about 8.4 moles of the oxides of zinc and beryllium with about 5 moles of silicic acid and about ½ mole of manganous carbonate, preheating said mixture at a temperature between 710° C. and 950° C. for about one hour, to cause said materials to combine, and finally heating said combined mixture at a temperature between about 1190° C. and 1210° C. for about one hour.

10. The method of manufacturing manganese-activated zinc-containing silicate phosphors comprising intimately mixing about 8.4 moles of the oxides of zinc and beryllium, with about 5 moles of silicic acid and about ½ mole of manganous carbonate, preheating said mixture at a temperature between about 710° and 950° C. for about one hour to cause said materials to combine as a desired silicate in a generally amorphous condition, and finally heating said combined mixture at a temperature between 1190° and 1210° C., for about one to two hours to cause desired crystallization for improvement in output.

11. A very white manganese-activated zinc beryllium silicate phosphor formed by preheating the mixture of about 7.4 moles of zinc oxide, about 1 mole of beryllia, about 5 moles of silica and about ½ mole of manganese, at a temperature between about 710° and 950° C. for about one hour and then firing the resulting phosphor at a temperature between about 1190° and 1210° C. for about one to two hours, in which the density is unusually great and the fluorescent output about 5% higher than that of the usual phosphor of that kind.

12. A very white manganese-activated zinc-containing silicate phosphor formed by preheating the mixture of about 8.4 moles of the oxides of zinc and beryllium, about 5 moles of silica, and about ½ mole of manganese, at a temperature between about 710° and 950° C. for about one hour and then firing the resulting phosphor at a temperature between about 1190° and 1210° C. for about one to two hours, in which the density is unusually great and the fluorescent output about 5% higher than that of the usual phosphor of that kind.

13. A very white manganese-activated zinc-containing silicate phosphor formed by preheating the mixture of about 8.4 moles of oxide selected from the group consisting of the oxides of zinc and beryllium, about 5 moles of silica, and about ½ mole of manganese, at a temperature of about 800° C. for about one hour and then firing the resulting phosphor at a temperature of about 1190° to 1210° C. for about one hour, in which the density and stability against photodecomposition are unusually great and the fluorescent output about 5% higher than that of the usual phosphor of that kind.

14. The method of manufacturing manganese-activated zinc beryllium silicate comprising thoroughly mixing in the aggregate about 8.4 moles of zinc oxide and beryllia, about 5 moles of silicic acid and about ½ mole of the manganese activator, preheating said materials at a temperature between about 710° and 950° C. for about one hour to cause the formation of the desired phosphor in a generally amorphous condition, the lower the temperature the longer the required time, and finally heating said silicate at a temperature between 1190° and 1210° C. for about one to two hours to cause desired crystallization for improvement in output.

15. The method of manufacturing manganese-activated zinc-containing silicate phosphors comprising thoroughly mixing the activator-included raw materials required to produce a silicate phosphor, preheating said material at a temperature between about 710° and 950° C. for about one hour to cause the formation of the desired phosphor in a generally amorphous condition, and finally heating said phosphor at a temperature between about 1190° C. and 1210° C. for about one to two hours.

16. A very white manganese-activated zinc-containing silicate phosphor, formed by preheating the mixture of the raw materials in the proportions required to produce said phosphor, at a temperature between about 710° and 950° C. for about one hour and then firing the resulting phosphor at a temperature between about 1190° and 1210° C. for about one to two hours, in which the density is unusually great and the fluorescent output about 5% higher than that of the usual phosphor of that kind.

17. A very white manganese-activated zinc silicate phosphor, formed by preheating the mixture of zinc oxide, silicic acid, and manganous carbonate in the proportions required to produce said phosphor, at a temperature between about 710° and 950° C. for about one hour and then firing the resulting phosphor at a temperature between about 1190° and 1210° C. for about one to two hours, in which the density is unusually great and the fluorescent output about 5% higher than that of the usual phosphor of that kind.

RUDOLPH NAGY.

REFERENCES CITED

The following references are of record in the file of this patent:

UNITED STATES PATENTS

| Number | Name | Date |
|---|---|---|
| 2,118,091 | Leverenz | May 24, 1938 |
| 2,243,097 | Henderson | May 27, 1941 |